March 12, 1968  R. L. ANGSTADT ET AL  3,373,048

HARDENING ACCELERATED PORTLAND CEMENT

Filed June 23, 1964

——— CEMENT CONTAINING Li$_2$C$_2$O$_4$
- - - - CONTROL

INVENTORS
RICHARD LEE ANGSTADT
FORREST R. HURLEY

BY
ATTORNEY

United States Patent Office 3,373,048
Patented Mar. 12, 1968

3,373,048
HARDENING ACCELERATED PORTLAND
CEMENT
Richard L. Angstadt, Silver Spring, and Forrest R. Hurley,
Ellicott City, Md., assignors to W. R. Grace & Co.,
New York, N.Y., a corporation of Connecticut
Filed June 23, 1964, Ser. No. 377,281
9 Claims. (Cl. 106—90)

ABSTRACT OF THE DISCLOSURE

Lithium oxalate is added to Portland cement compositions to accelerate the hardening rate of the cement.

This application relates to a cement composition having an accelerated hardening rate and to the method for making this composition.

In summary, the process of this invention is a method for producing a cement mixture having an accelerated hardening rate comprising adding to an alite cement from about 0.1 to 10% lithium oxalate based on the dry weight of the cement binder, and intimately mixing the ingredients to provide a uniform distribution of the lithium oxalate throughout the cement.

In summary, the process of this invention is a method for accelerating the rate of hardening of an alite cement comprising mixing an alite cement, water, and from 0.1 to 10% lithium oxalate based on the dry weight of the cement binder, and allowing the mixture to harden.

In summary, the composition of this invention is an alite cement containing from about 0.1 to 10% lithium oxalate based on the dry weight of the cement binder.

In many of the uses of alite cement, of which Portland cement and mortars and concretes containing Portland cement, are the most common examples, it is desirable to accelerate the rate of hardening thereof. As the rate of hardening is accelerated, heat evolution is also accelerated, and the additional heat is useful in winter for keeping the water in the cement from freezing. Furthermore, in many uses it is desirable that the concrete hardening be sufficiently slowed to enable the concrete to be poured in place, but after the concrete is placed, rapid hardening is desired. In the production of molded objects of concrete, accelerated hardening allows the use of fewer mold and lowers the necessary capital investment. In the process for cementing oil wells, the cement must remain sufficiently fluid to be deposited in the well, but it is desirable to accelerate the deposited cement rapidly thereafter.

A wide variety of inorganic compounds have been found to be active accelerators of alite cement hardening. The most commonly employed accelerator is calcium chloride. However, calcium chloride has a serious deficiency. The calcium chloride in the cement promotes corrosion of iron reinforcing rods and mesh often used in concrete construction, since calcium chloride is itself extremely corrosive.

It is one object of this invention to provide a method for accelerating the hardening rate of alite cements with a non-corrosive accelerator.

It is another object of this invention to provide alite cements having an accelerated rate of hardening but which does not contain a corrosive accelerator.

Figure 1:
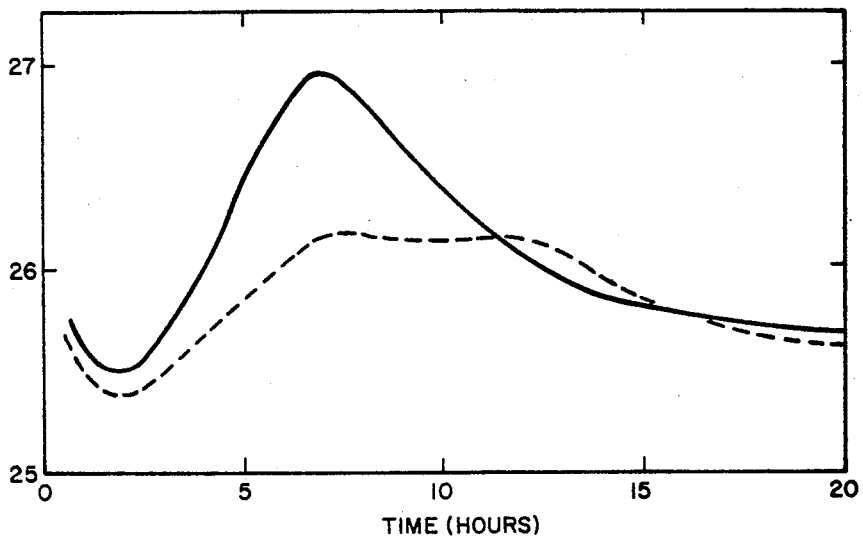
Figure 2:
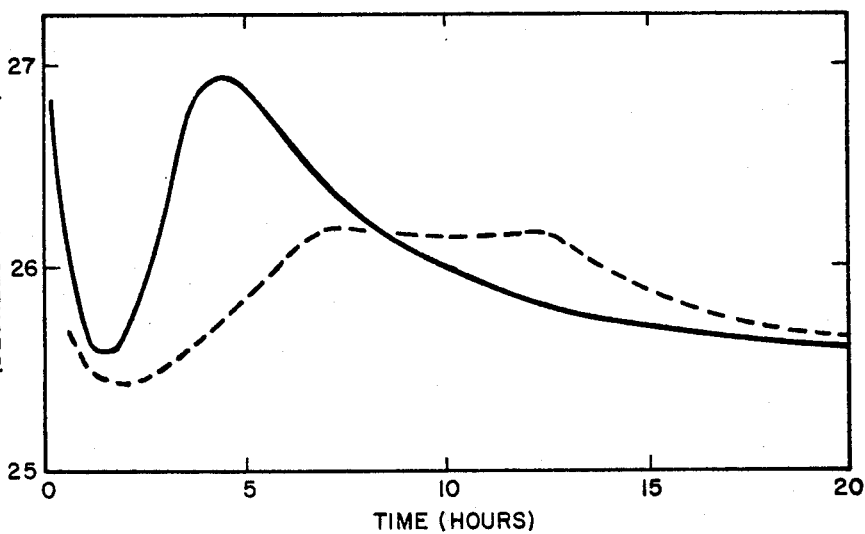

FIGURES 1 and 2 illustrate the acceleration of alite cements with lithium oxalate.

The binder component in the cements, mortars and concretes used widely as a construction material is Portland cement. Portland cement is manufactured by calcining a mixture of limestone and clay to form a clinger, and by grinding the clinker to a fine powder. The major compounds found in Portland cement are tricalcium silicate, dicalcium silicate, tricalcium aluminate, and tetracalcium aluminoferrite. The tricalcium and dicalcium silicates are thought to be the principal bonding constituent in the Portland cement. Tricalcium silicate when mixed with water forms a calcium silicate hydrate known as tobermorite gel and calcium hydroxide. The dicalcium silicate when contacted with water forms similar products but at a much lower rate of reaction. The tricalcium silicate, having the greater rate of reaction determines, to a large extent, the hardening rate of the cement. To provide materials which are suitable for different uses, Portland cements having a range of hardening rates have been found desirable. By producing cements having a range of proportions of tricalcium silicate present, a range of hardening rates has been obtained. Four general types of Portland cements, varying principally in the relative quantities of tricalcium silicate and dicalcium silicate present therein, are commonly produced. The proportions of the principal compounds present in each type of cement are shown in Table I.

Table I

| Cement Type | I | II | III | IV |
|---|---|---|---|---|
| Composition, wt. percent: | | | | |
| Tricalcium silicate | 53 | 47 | 58 | 26 |
| Dicalcium silicate | 24 | 32 | 16 | 54 |
| Tricalcium aluminate | 8 | 3 | 8 | 2 |
| Tetracalcium aluminoferrite | 8 | 12 | 8 | 12 |

The term "alite cement" is defined as including neat pastes, mortars, and concretes and the mixed, dry, unreacted ingredients of neat pastes, mortars, and concretes, comprising as alite cement binder, a composition containing greater than 20 percent tricalcium silicate based on the dry weight of the composition. The most common alite cements are Portland cements, and mortars and concretes containing Portland cements. Most commercially available alite, cements contain binders comprising from about 20 to 75 percent tricalcium silicate. The alite cement binder, or cement binder is the component which provides the desired bonding, for example, Portland cement.

A wide range of the hardening rates can be obtained by producing cement having varying quantities of tricalcium silicate such as are shown in Table I. However, the particular proportion of the cement ingredients and the rate of hardening obtained is limited by the types of raw materials from which the cement is produced. As a result, for some uses even the Type III cement does not harden at a desired accelerated rate. Furthermore, in some uses such as in oil well treatment, a very low rate of initial hardening is desired such as is provided by the Type IV cement so that the cement can be mixed and placed, before it loses its fluidity. However, once in place, it is desirable to provide a rapid rate of hardening.

Accelerators are employed to meet these requirements. Accelerators are compositions which have been found to increase the initial rate of hardening of a cement. The most widely used cement, mortar, and concrete accelerator is calcium chloride. However, this compound creates serious difficulties when iron reinforcing rods and mesh are employed in concrete construction. Calcium chloride is extremely corrosive.

Lithium oxalate has been found to be a superior alite cement hardening accelerator. Not only does the lithium oxalate provide a rapid alite cement hardening rate, but the lithium oxalate is a non-corrosive accelerator. When the alite cement is used in the presence of iron or other metal reinforcing materials, lithium oxalate can be used without creating corrosion problems. Acceleration of alite cements with lithium oxalate can be obtained with from about 0.1 to 10 percent lithium oxalate in the cement binder. Preferably, from about 1 to 5 percent lithium oxalate is employed. Concentrations of lithium oxalate greater than about 10 percent cause execessive hardening rates and cement dilution, both of which impair the strength of the hardened product.

The lithium oxalate can be added to the alite cement by various techniques. Lithium oxalate can be added to alite cement binder clinker prior to grinding can be thoroughly mixed with the cement component during the grinding step. The lithium oxalate can also be added to the binder cement powder as a dry powder, slurry, or water solution, and the ingredients can be thoroughly mixed to uniformly disperse the active ingredients. The lithium oxalate can be dissolved in the water with which the binder is mixed to form a hardening composition. The alite cement binder can be premixed with water and then mixed or contacted with the lithium oxalate accelerator. For example, in processes for cementing wells, the cement can be deposited on the interior well wall, and the lithium oxalate in a water soltuion can be contacted with the deposited cement to provide an accelerated hardening rate. In general, the accelerator can be added to the cement at any stage prior to its final hardening.

Our invention is further illustrated by the following specific, but non-limiting examples.

EXAMPLE 1

In this example the rate of tricalcium silicate hydration was determined using lithium oxalate as the accelerator. Quantitative X-ray diffraction analyses were employed to measure the proportion of tricalcium silicate which had been hydrated. The alite cement employed was a Type I Portland cement. The results are shown in Table II.

Table II

| Concentration of $Li_2C_2O_4$ in cement, wt. percent | Water-cement, wt. ratio | Percent tricalcium silicate hydrated | | |
|---|---|---|---|---|
| | | 5 hrs. | 10 hrs. | 24 hrs. |
| 0 | 0.25 | 1 | 24 | 45 |
| 1.0 | 0.25 | 9 | | |
| 0 | 0.30 | 1 | 19 | 47 |
| 1.2 | 0.30 | 15 | 30 | 54 |

As can be seen, the lithium oxalate provided an initial rate of hardening which was many times greater than that of the untreated cement.

EXAMPLE 2

In this example calorimetry was used to monitor the hydration of Portland cement. The hydration of Portland cement is accompanied by the liberation of heat. This liberation of heat was recorded as a temperature increase on a recorder. In this example a Type I Portland cement was employed. The water to cement ratio was 0.325 in each case. The results are shown in FIGURE 1. In FIGURE 1 the percentage of lithium salt added is given as weight percent of the Portland cement present on a dry basis. The dashed line in FIGURE 1 is a normal hydration profile of the cement without the accelerator.

EXAMPLE 3

In this example the accelerating effect of 2.0% lithium oxalate based on the dry weight another sample of a Type I Portland cement employed was measured as a function of time by calorimetry technique. The water to cement ratio was 0.325. The results of this test are shown in FIGURE 2. The unbroken line is the measurement obtained with the sample containing lithium oxalate, and the broken line is the result obtained with the untreated cement.

EXAMPLE 4

Cements containing lithium oxalate harden more rapidly than the untreated cement and obtain higher early strengths. In this example, the increased rate of hardening in the presence of lithium oxalate was determined by measuring the time of setting. The ASTM Standard Method of Test for Time of Setting of Hydraulic Cement by Vicat Needle (ASTM C191–58) was followed. A Type III Portland cement and a 0.40 water to cement weight ratio was used. The results are shown in Table III.

Table III

| Concentration of $Li_2C_2O_4$ in cement, wt. percent: | Time of setting, hrs. |
|---|---|
| 0 | 4.2 |
| 0.50 | 3.9 |
| 1.00 | 3.3 |

EXAMPLE 5

In this example the one day compressive strengths of Portland cement mortar cubes were determined following the ASTM Standard Method of Test for the Compressive Strength of Hydraulic Cement Mortars Using 2-inch Cube Specimens (ASTM C109–58). Nine determinations were made in each case. The average value and average deviation are reported in Table IV. A Type I cement and a 0.65 water to cement ratio was employed.

Table IV

| Concentration of $Li_2C_2O_4$ in cement, wt. percent: | Compressive strength, p.s.i. |
|---|---|
| 0 | 567±52 |
| 0.5 | 625±22 |
| 1.0 | 678±45 |
| 2.0 | 803±38 |

Obviously, many modifications and variations of the invention as hereinabove set forth may be made without departing from the essence and scope thereof, and only such limitations should be applied, as are indicated in the appended claims.

We claim:
1. A process for producing a cement mixture having an accelerated hardening rate comprising,
 (a) adding to a Portland cement from about 0.1 to 10% lithium oxalate based on the dry weight of the cement binder, and
 (b) thoroughly mixing the components of the mixture.
2. A process for producing a cement mixture having an accelerated hardening rate comprising,
 (a) mixing from about 0.1 to 10% lithium oxalate with a Portland cement binder clinker, and
 (b) grinding the mixture to form a fine particle size, homogeneous cement.
3. A process for producing a cement mixture having an accelerated hardening rate comprising,
 (a) adding water and lithium oxalate to a Portland cement, the amount of lithium oxalate added being from about 0.1 to 10% of the dry weight of the cement binder, and
 (b) thoroughly mixing the components of the mixture.
4. The process of claim 3 wherein the lithium oxalate is added to the cement in a water solution.
5. A process for accelerating the hardening rate of Portland cement comprising,
 (a) adding to a Portland cement from about 0.1 to 10% lithium oxalate based on the dry weight of the cement binder,
 (b) mixing the components to form a homogeneous mixture, and
 (c) adding water to the mixture.
6. A process for accelerating the hardening rate of
 (a) mixing Portland cement binder clinker with from about 0.1 to 10% lithium oxalate based on the dry weight of the Portland cement, with a Portland cement binder clinker,
 (b) grinding the mixture to form a fine particle size, homogeneous cement, and
 (c) adding water to the mixture.
7. A process for accelerating the hardening rate of a Portland cement comprising,

(a) adding water to a Portland cement to form a settable mixture, and
(b) contacting the settable mixture with about 0.1 to 10% lithium oxalate.

8. The process of claim 7 wherein the lithium oxalate is in the form of an aqueous solution.

9. A cement composition consisting essentially of a Portland cement and from about 0.1 to 10% lithium oxalate based on the dry weight of the Portland cement binder.

References Cited

UNITED STATES PATENTS

| | | | |
|---|---|---|---|
| 300,560 | 6/1884 | Bening | 106—90 |
| 1,891,701 | 12/1932 | Winkler | 106—90 |
| 1,908,637 | 5/1933 | Langenberg | 106—90 |
| 2,857,286 | 10/1958 | Striker | 106—102 |

TOBIAS E. LEVOW, *Primary Examiner.*

S. E. MOTT, *Assistant Examiner.*